M. DEAN & A. B. KINGSBURY.
ASH-SIFTER.
No. 193,230. Patented July 17, 1877.
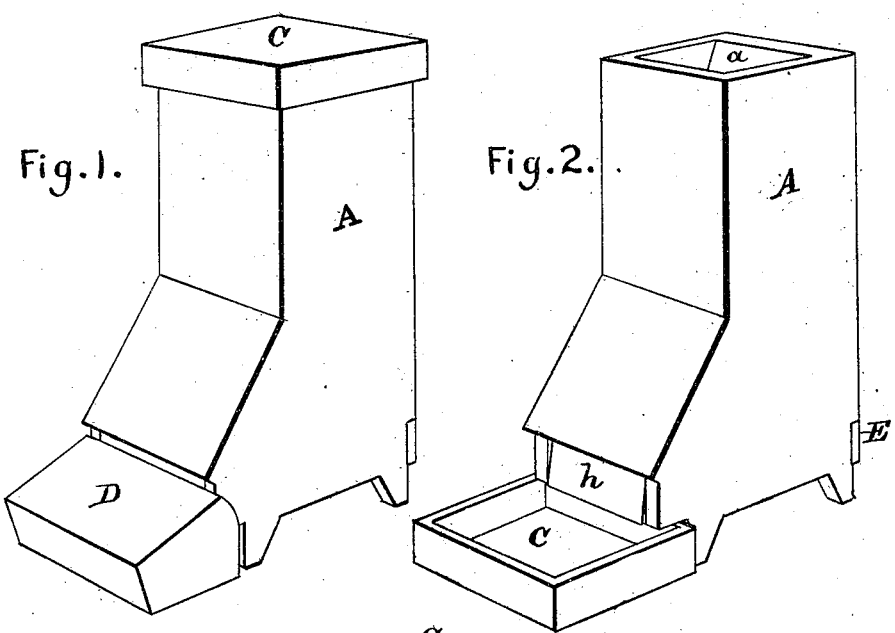
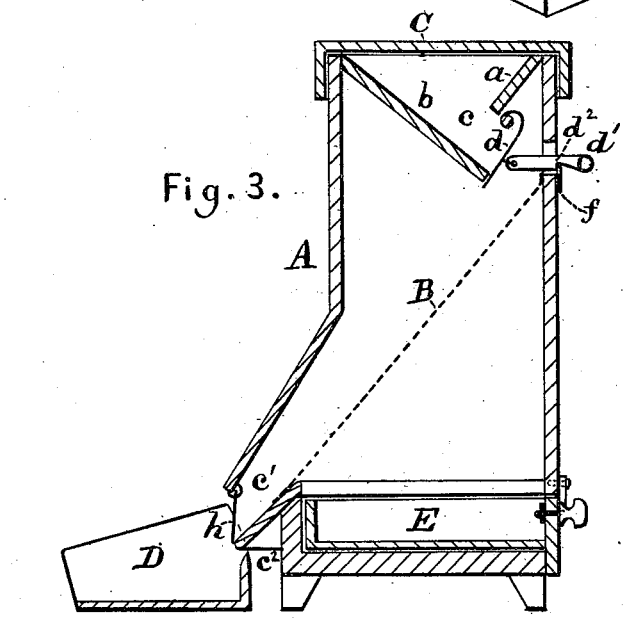
Witnesses:
H. A. Daniels
G. B. Towles
Inventor
Milton Dean
Andrew B. Kingsbury
by W. Morris
Attorney

UNITED STATES PATENT OFFICE.

MILTON DEAN AND ANDREW B. KINGSBURY, OF UTICA, NEW YORK; SAID KINGSBURY ASSIGNOR TO SAID DEAN.

IMPROVEMENT IN ASH-SIFTERS.

Specification forming part of Letters Patent No. 193,230, dated July 17, 1877; application filed April 10, 1877.

*To all whom it may concern:*

Be it known that we, MILTON DEAN and ANDREW B. KINGSBURY, of Utica, in the county of Oneida and State of New York, have invented certain new and useful Improvements in Ash-Sifters; and we do hereby declare that the following is a full, clear, and exact description thereof, which will enable others skilled in the art to which it appertains to make and use the same, reference being had to the accompanying drawings, and to the letters of reference marked thereon, which form a part of this specification, in which drawings—

Figure 1 is a perspective view, showing the box-cover on the sifter-box, and the inclosed receiver under the discharge-port. Fig. 2 is a perspective view, showing the cover under the discharge-port to receive the sifted coal. Fig. 3 is a vertical section.

Our invention relates to ash-sifters, constructed and operated as hereinafter described.

A is a box of the proper size, provided with an inclined sieve, B. The upper part of the box is provided with inclined plates $a$ $b$, adjusted to form the receiving-hopper, having a throat, $c$, for receiving and conducting the unsifted coal and ashes to the sieve. The throat is covered with a lid or trap, $d$, having pivoted bearings in the sides of the box, adjusted to open and close the throat automatically, or by means of the handle $d^1$, extending through a slot in the back plate of the box, and connected to an eye on the side of the lid, and provided with a notch, $d^2$, to catch against the plate $f$, fastened to the box.

C represents a cover to the sifter-box, having pendent sides the proper width to fit the recess under the exit-port sides forming a box sufficiently deep to hold the sifted coal, when used for that purpose, as shown, adjusted under the exit-port in Fig. 2 of the drawings. D represents an inclosed receiver, constructed to fit over the exit-port of the sifter, as shown in Fig. 1 of the drawings. E is a drawer, extending under the sieve to receive the sifted ashes. The lower part of the box is enlarged, to afford space for the sieve, and is provided with an exit-port, $c^1$, extending over a recess, $c^2$. The exit-port is provided with a lid, $h$, adjusted on pivotal bearings, to open and close automatically the port to prevent the escape of dust.

When a small quantity, or only a hodful at a time, is to be sifted, the inclosed sifter D is adjusted over the exit-port, and the lid $d$ is adjusted by means of the handle $d^1$, to hold the coal and ashes in the hopper till the cover C is placed on the box, to prevent the escape of dust, and then the trap is opened, allowing the ashes and coal to pass out of the hopper to the sieve, the ashes passing through the sieve into the drawer, and the coal being conducted through the exit-port into the receiver, the lid $h$ opening and closing automatically, to prevent the escape of dust.

When large quantities are to be sifted, the cover C is adjusted in the recess $c^2$ under the exit-port, as shown in Fig. 2 of the drawings, and the trap $d$ is adjusted to open and close automatically, to prevent the escape of dust.

What we claim as new, and desire to secure by Letters Patent, is—

1. The ash-sifter, having an exit-port, $c^1$, extending over a recess, $c^2$, in combination with a removable cover, C, having pendent sides the proper width to fit the recess under the exit-port, adapting it to be used interchangeably as the cover of the ash-sifter, and as the receiver of the sifted coal, substantially as described.

2. In an ash-sifter, the lid or trap $d$, having pivotal bearings, and provided with an adjusting bar or handle, $d^1$, having a notch, $d^2$, in combination with the plate $f$, for opening and closing the throat of the receiving-hopper of the sifter, substantially as described.

3. The removable cover C and the receiver D, in combination with the ash-sifter having the inclined sieve B and traps or lids $d$ $h$, adjusted to operate substantially as and for the purposes described.

In testimony that we claim the foregoing as our own we affix our signatures in presence of two witnesses.

MILTON DEAN.
ANDREW B. KINGSBURY.

Witnesses:
JOHN BACH,
W. N. REESE.